US011930319B2

(12) United States Patent
Sadanandan

(10) Patent No.: US 11,930,319 B2
(45) Date of Patent: Mar. 12, 2024

(54) UNDERWATER EAR POD SYSTEM

(71) Applicant: Rishi Sai Sadanandan, Tarpon Springs, FL (US)

(72) Inventor: Rishi Sai Sadanandan, Tarpon Springs, FL (US)

( * ) Notice: Subject to any disclaimer, the term of this patent is extended or adjusted under 35 U.S.C. 154(b) by 142 days.

(21) Appl. No.: 17/746,732

(22) Filed: May 17, 2022

(65) Prior Publication Data

US 2022/0279271 A1 Sep. 1, 2022

Related U.S. Application Data

(63) Continuation-in-part of application No. 29/767,535, filed on Jan. 22, 2021, now Pat. No. Des. 956,204.

(60) Provisional application No. 63/283,924, filed on Nov. 29, 2021.

(51) Int. Cl.
*H04R 1/44* (2006.01)
*H04R 1/10* (2006.01)

(52) U.S. Cl.
CPC ............. *H04R 1/44* (2013.01); *H04R 1/1016* (2013.01); *H04R 2420/07* (2013.01)

(58) Field of Classification Search
CPC ..... H04R 1/44; H04R 1/1016; H04R 2420/07
See application file for complete search history.

(56) References Cited

U.S. PATENT DOCUMENTS 5,117,403 A * 5/1992 Eberl ....................... H04R 1/44 367/175
5,853,005 A * 12/1998 Scanlon ............... A61B 5/6896 381/166
9,794,668 B2 * 10/2017 Masaki ................ H04R 25/505
(Continued)

FOREIGN PATENT DOCUMENTS

CN 2287940 Y * 8/1998
CN 201674645 U 12/2010
(Continued)

OTHER PUBLICATIONS

Mifo 05 TWS Bluetooth 5.0 Wireless Earphone Headset, Retrieved from Internet, Retrieved on Aug. 13, 2020 <URL:https://www.aliexpress.com/item/33020783992.html>.
(Continued)

*Primary Examiner* — Oyesola C Ojo

(57) ABSTRACT

The underwater ear pod system is a multifunctional device that allows a user to listen to music and other audio signals transmitted through a transmitting device during underwater activities, while keeping water out of the swimmer or diver's ear. To accomplish this, the system comprises a waterproof earplug device and a well-connected communicating system, wherein the transmitting device may be positioned outside the water body or maintained floating over the surface of the water body, depending on the activity of the user. Further, the device can have emergency SOS signals automatically sent at predetermined intervals or on an as-needed basis based on button/touch inputs to add a layer of safety for swimmer's or divers. Furthermore, the device is compact, thereby facilitating portability and ease of storage. Thus, the underwater ear pod system is a multifunctional and cost-efficient ear pod system that can make aquatic activities more enjoyable, convenient, and safe.

18 Claims, 7 Drawing Sheets

(56) References Cited

U.S. PATENT DOCUMENTS

| | | | | |
|---|---|---|---|---|
| 10,764,667 | B2 * | 9/2020 | Higgins | H04R 1/1016 |
| 10,827,249 | B1 * | 11/2020 | Pine | H04R 1/1041 |
| 11,523,202 | B2 * | 12/2022 | Au | H04R 25/609 |
| 2009/0074220 | A1 * | 3/2009 | Shennib | H04R 25/02 381/328 |
| 2020/0186903 | A1 * | 6/2020 | Higgins | H04R 25/65 |

FOREIGN PATENT DOCUMENTS

| | | | | | |
|---|---|---|---|---|---|
| CN | 204839925 | U | * | 12/2015 | A61F 11/14 |
| CN | 206728257 | U | * | 12/2017 | H04R 1/10 |
| CN | 206759689 | U | * | 12/2017 | H04R 1/10 |
| CN | 207340142 | U | * | 5/2018 | H04R 1/10 |
| CN | 108513203 | A | | 9/2018 | |
| CN | 208623872 | U | * | 3/2019 | H04R 1/1025 |
| CN | 112153552 | | * | 12/2020 | H04S 3/004 |
| CN | 112153552 | A | * | 12/2020 | H04S 3/002 |
| CN | 212324325 | U | * | 1/2021 | H04R 1/10 |

OTHER PUBLICATIONS

JBL Endurance DIVE, Retrieved from Internet, Retrieved on Aug. 13, 2020 <URL: https://www.jbl.com/endurance-headphones-series/JBL+Endurance+DIVE.html>.

* cited by examiner

UNDERWATER EAR POD SYSTEM

FIELD OF THE INVENTION

The present invention generally relates to an underwater ear pod system. More specifically, the present invention relates to a waterproof earplug that allows a user to listen to audio signals during underwater activities, while preventing water to enter into the user's ears.

BACKGROUND OF THE INVENTION

A waterproof earplug that offers capabilities of communicating wirelessly and listening to music is in demand. People can insert an earplug into the ear canal to protect it from noise, water, or foreign bodies. However, in some situations people may wish to use an earplug like earphones or an earpiece that can convey audio signals. For example, a swimmer may desire to listen to music while performing aquatic workouts. Despite the existence of advanced waterproofing technologies for earphones, delivery of clear, crisp audible sound to the user is hindered when earphones are used underwater due to intervening fluid (water) within the ear canal, which may significantly attenuate or distort sounds, preventing the user from fully enjoying the audible sounds originating from the earphones. In other instances, water that accumulates in the ear canal may cause an earphone to slide or fall off the ear, preventing the user from enjoying audible sounds uninterrupted during underwater activity. Any periodic movement or jolting during a swimmer's physical activity may displace an earphone or earpiece within the ear canal so that audible sounds emanating from the earphone become misdirected, attenuated, or distorted. Currently available earplugs are not designed to provide effective protection and are expensive when combined with wireless communication capability. Thus, there is a need to develop a device to solve the problems.

The present invention is intended to address problems associated with and/or otherwise improve on conventional devices through an innovative earplug device that is designed to provide a convenient, effective, and inexpensive means of protecting ears from water intrusion while offering wireless communication capabilities and incorporating other problem-solving features.

SUMMARY

The present invention allows a user to listen to music and other audio signals transmitted through a transmitting device during underwater activities. The present invention also keeps water out of the swimmer or diver's ear. The combination of keeping water out and opening a channel for listening to music or receiving audio instructions makes the present invention a desirable aquatic gadget. Further, the pods of the present invention can have emergency SOS signals automatically sent at predetermined intervals or on an as-needed basis based on button/touch inputs to add a layer of safety for swimmer's or divers. Furthermore, the present invention is compact, thereby facilitating portability and ease of storage. Thus, the present invention is a multi-functional and cost-efficient ear pod system that can make aquatic activities more enjoyable, convenient, and safe.

DETAIL DESCRIPTIONS OF THE INVENTION

Figure 1:
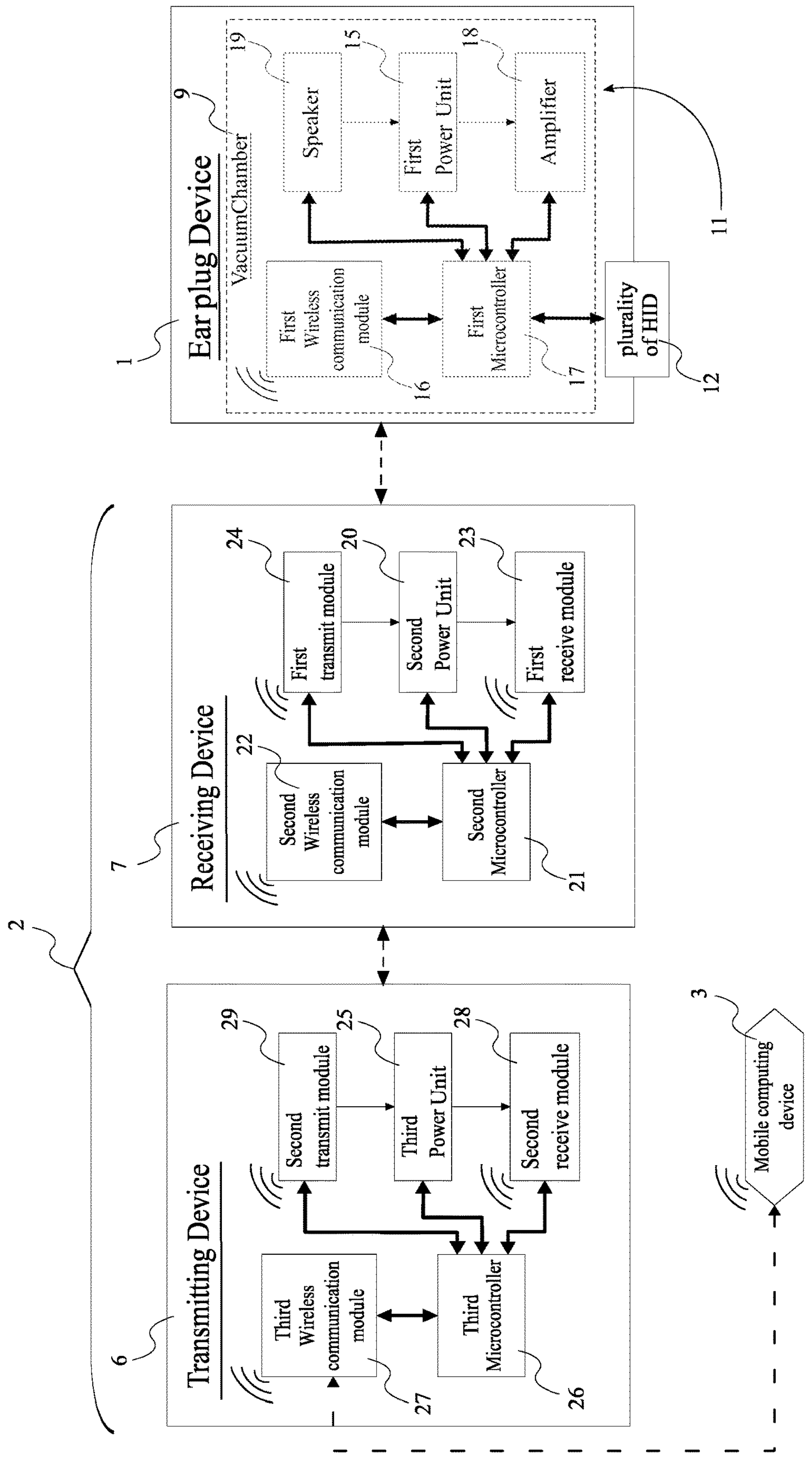
FIG. 1 is a block diagram of the present invention, wherein thinner flowlines represent electrical connections between components, thicker flowlines represent electronic connections between components, and dashed flow lines indicate the components being communicably coupled.

All illustrations of the drawings are for the purpose of describing selected versions of the present invention and are not intended to limit the scope of the present invention.

The present invention allows a user to listen to music and other audio signals transmitted through a transmitting device during underwater activities. The present invention also keeps water out of the swimmer or diver's ear. The combination of keeping water out and opening a channel for listening to music or receiving audio instructions makes the present invention a desirable aquatic gadget. Further, the pods of the present invention can have emergency SOS signals automatically sent at predetermined intervals or on an as-needed basis based on button/touch inputs to add a layer of safety for swimmer's or divers. In other words, the present invention provides an SOS function, which may be manual or automatic. For example, if the user is scuba diving and encounters a shark or other dangerous animal, or if the user's oxygen tank falls off the user's body or malfunctions, the user can press the SOS button to send an SOS signal to a designated person on a boat or someone otherwise nearby who can provide help. Alternately, if a user is scuba diving and suddenly faints or has a seizure under high water pressures, the present invention's automatic SOS function can detect the user's unconscious state and automatically send an SOS signal. Furthermore, the present invention is compact, thereby facilitating portability and ease of storage. Thus, the present invention is a multifunctional and cost-efficient ear pod system that can make aquatic activities more enjoyable, convenient, and safe.

The following description is in reference to FIG. 1 through FIG. 7. According to a preferred embodiment, the present invention comprises an earplug device 1, a communication system 2, and a mobile computing device 3. The earplug device 1 of the present invention may function as a set of headphones or other listening devices adapted for placement within the ear when worn by a user 4. Preferably, the earplug device 1 may be of any shape, size, and material suitable for protecting the ear, including silicon and other materials of similar characteristics. Further, the earplug device 1 can include a structure that is designed to protect ear from water. To that end, the earplug device 1 is inserted into at least one ear canal of the user 4, wherein the user 4 is engaged in a water-related activity within a water body 5. According to the preferred embodiment, the earplug device 1 is communicably coupled with the mobile computing device 3 through the communication system 2. This is so that the user 4 who has the earplug device 1 inserted into their ear may receive audio signals and instructions from the mobile computing device 3 through the communication system 2, even when the user 4 is swimming or diving within the water body 5. In other words, the earplug device 1 of the present invention provides a waterproof system allowing operation in an aqueous environment, where the system can be wirelessly couplable to a waterproof or water-resistant media player or another user computing device adapted for operation in an aqueous environment.

The mobile computing device 3 may be a laptop computer, a cellular phone, a personal digital assistant (PDA), a tablet computer, and other mobile devices of the type. It should be noted that communications between components and/or devices in the systems and methods disclosed herein may be unidirectional or bidirectional electronic communication through a wired or wireless configuration or network. For example, one component or device may be wired or networked wirelessly directly or indirectly, through a third-party intermediary, over the internet, or otherwise with another component or device to enable communication between the components or devices. Examples of wireless communications include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks of the type. In example embodiments, network can be configured to provide and employ 5G wireless networking features and functionalities. However, the present invention may comprise and employ any other communication means and technology that are known to one of ordinary skill in the art, as long as the intents of the present invention are not altered.

According to the preferred embodiment, the communication system 2 comprises a transmitting device 6 and a receiving device 7. Preferably, the transmitting device 6 is wirelessly connected to the mobile computing device 3 and the receiving device 7 is wirelessly connected to the earplug device 1. A transmitter or the transmitting device 6 is an electronic device used in telecommunications to produce radio waves in order to transmit or send data with the aid of an antenna. The transmitter is able to generate a radio frequency alternating current that is then applied to the antenna, which, in turn, radiates this as radio waves. The receiving device 7 uses electronic filters to separate the desired radio frequency signal from all the other signals picked up by the antenna, an electronic amplifier to increase the power of the signal for further processing, and finally recovers the desired information through demodulation. In the preferred embodiment the receiving device 7 is integrated into an ear pod case. It should be noted that the transmitting device 6 and the receiving device 7 may comprise any brand, size, technology, etc. that are known to one of ordinary skill in the art, as long as the objectives of the present invention are fulfilled.

Figure 2:
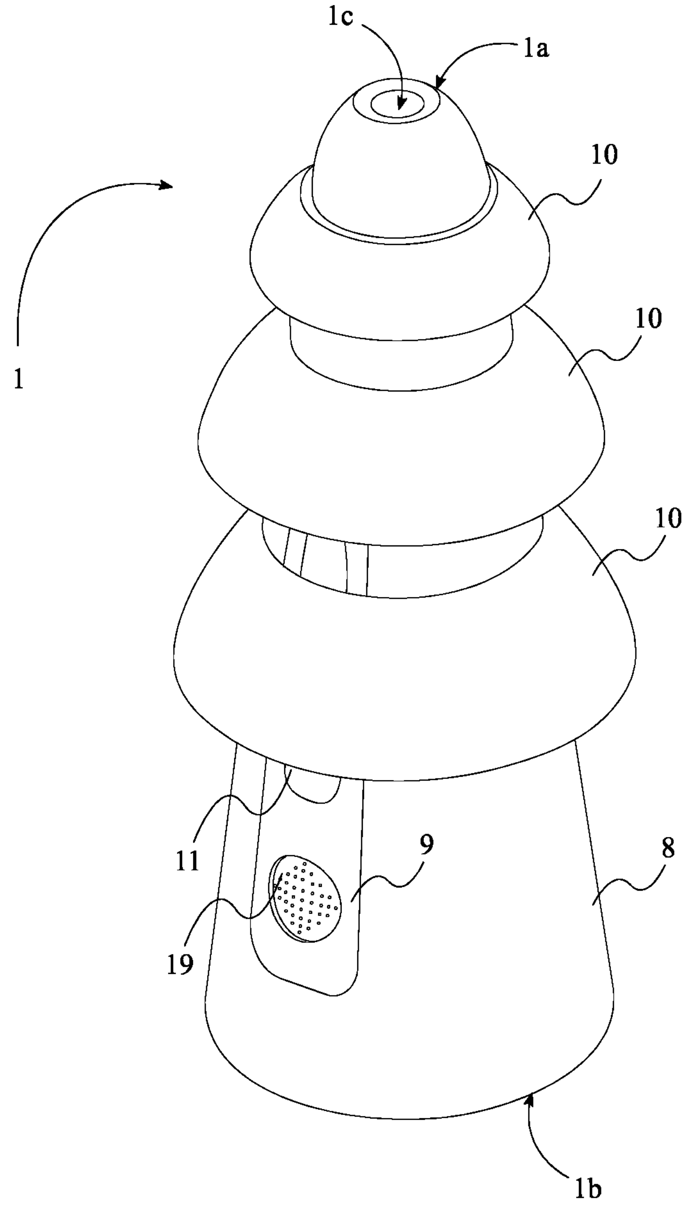
FIG. 2 is a top-front-left perspective view of an ear plug member, according to a preferred embodiment of the present invention.
Figure 3:
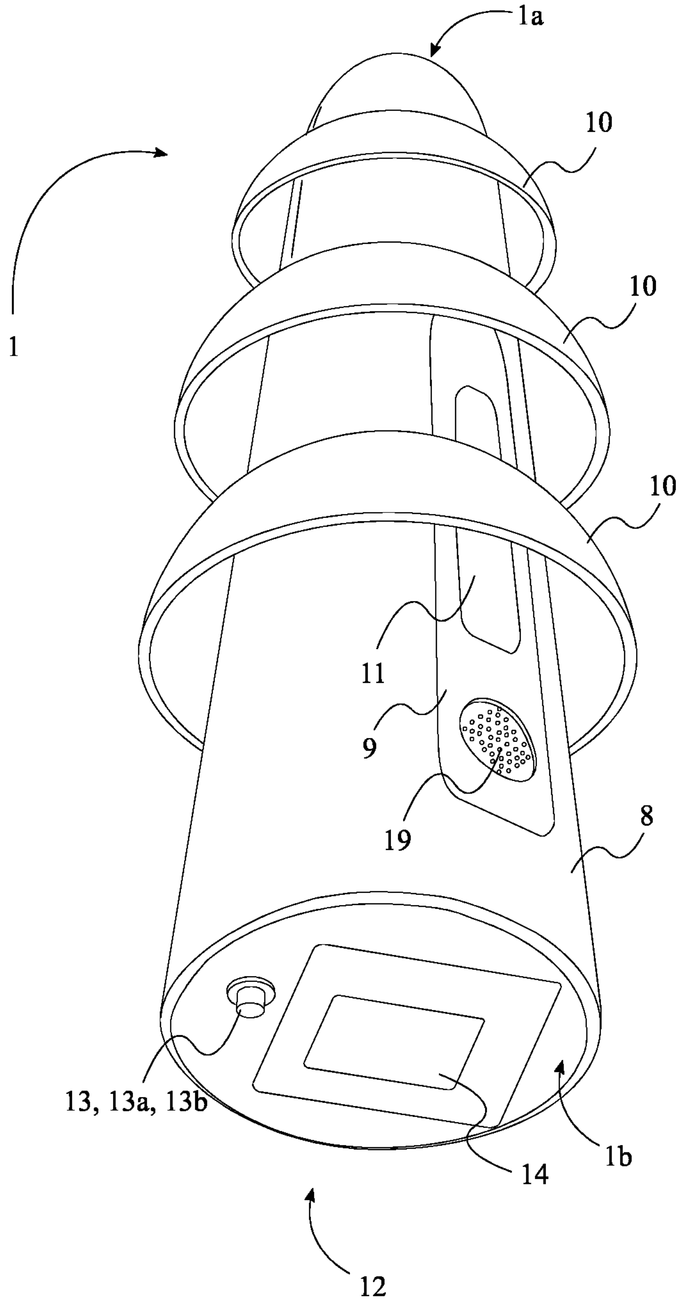
FIG. 3 is a bottom-front-right perspective view of the ear plug member.

As seen in FIG. 1 through FIG. 3, the earplug device 1 comprises a silicone case 8, a vacuum chamber 9, a plurality of flanges 10, a communication member 11, and a plurality of human interface devices (HID) 12. Preferably, the silicone case 8 can include a structure that is designed to protect ear from water. As seen in FIG. 2 and FIG. 3, the silicone case 8 is conical in shape, so that the tip of the cone will enter the ear when installing the earplug device. Preferably, the plurality of flanges is laterally mounted onto the silicone case 8, such that the plurality of flanges 10 may prevent any water from entering into the user's 4 ears, when the present invention is in use. To accomplish that, the plurality of flanges 10 is flexible. In the preferred embodiment, the plurality of flanges 10 includes three ring-shaped flanges of increasing diameter (which can include a larger ring diameter proceeding along the length in an outward direction), as shown in FIG. 2 and FIG. 3. In some embodiments, the tip portion of the silicone case 8 may be molded to one or more flanges that may be reversible and flexible for ease of cleaning. Further, in some embodiments, multiple silicone flanges may be placed around the silicone case 8 so that it can easily slide into the ear and prevent water from entering. The plurality of flanges 10 (rings) may be small at one end but gradually increase in size toward the other end. However, the silicone case 8 and the plurality of flanges 10 may comprise any other shape, material, dimensions, orientation, etc. as long as the intents of the present invention are not altered.

According to the preferred embodiment, the vacuum chamber 9 is positioned within the silicone case 8, and the communication member 11 is mounted within the vacuum chamber 9. The communication member 11 is configured to enable wireless communication (e.g., Bluetooth/5G) between the earplug device 1 of the present invention and other mobile computing devices 3 so that the user 4 can play music, communicate, and/or receive instructions underwater through the wireless communication. In some embodiments, the silicone case 8 is configured to include communication chips (e.g., a Bluetooth or 5G microchip) and a speaker may be implanted into a vacuum seal. Such a vacuum seal may ensure integrity of the electronics.

Continuing with the preferred embodiment, the plurality of HID 12 comprises at least one of, at least one control button 13, a sensor member 14, and an SOS (save our ship) signal member **13*a*. Preferably, the plurality of HID 12 is externally mounted onto the silicon case 8 as seen in FIG. 3. Preferably, the sensor member 14 is a haptic sensor that re-creates the sense of touch by recognizing force, vibration, and motion sensations created by the user. The haptic sensor can allow the user to tap or touch the sensor to send signals to an outside source. In some embodiments, the haptic sensor or sensor member 14** may be configured so that when they are not touched or tapped within a set interval (e.g., once every few minutes), SOS signals are automatically sent to an outside source, whether the user's or another designated person's computing device. In such embodiments, software (e.g., voice reminders) can be included so that users can be notified via the speaker (which can be included in the SOS signal member) to touch or tap it within the predetermined interval.

The at least one control button 13 may include one or more buttons that may be pressed or depressed for a certain time (e.g., 3 seconds) to send an SOS signal to an outside source. In some embodiments, the plurality of HID 12 may include voice countdown software to notify the user of the elapsed time. The plurality of HID 12, can be located any suitable place on the earplug device 1. In some embodiments, the HID 12 can be placed inside the earplug device 1 at its external end, protruding from the ear, so that the sensors can be easily touched or tapped and the SOS buttons easily felt and pushed with a finger, as shown in FIG. 3.

Alternately, haptic controls or haptic sensors may be used to control the operation of the earplug device 1 as well. Accordingly, the haptic controls may be configured to initiate operations based on the number of touches. For example, if the user 4 touches on the haptic control (sensor member 14) once, the play button may be activated, press twice and the volume of the playback may increase, press thrice and the volume of the playback may decrease etc. However, the sensor member 14 may be configured in any other method, configuration, technology etc. that are known to one of ordinary skill in the art, as long as the intents of the present invention are not altered.

Figure 4:
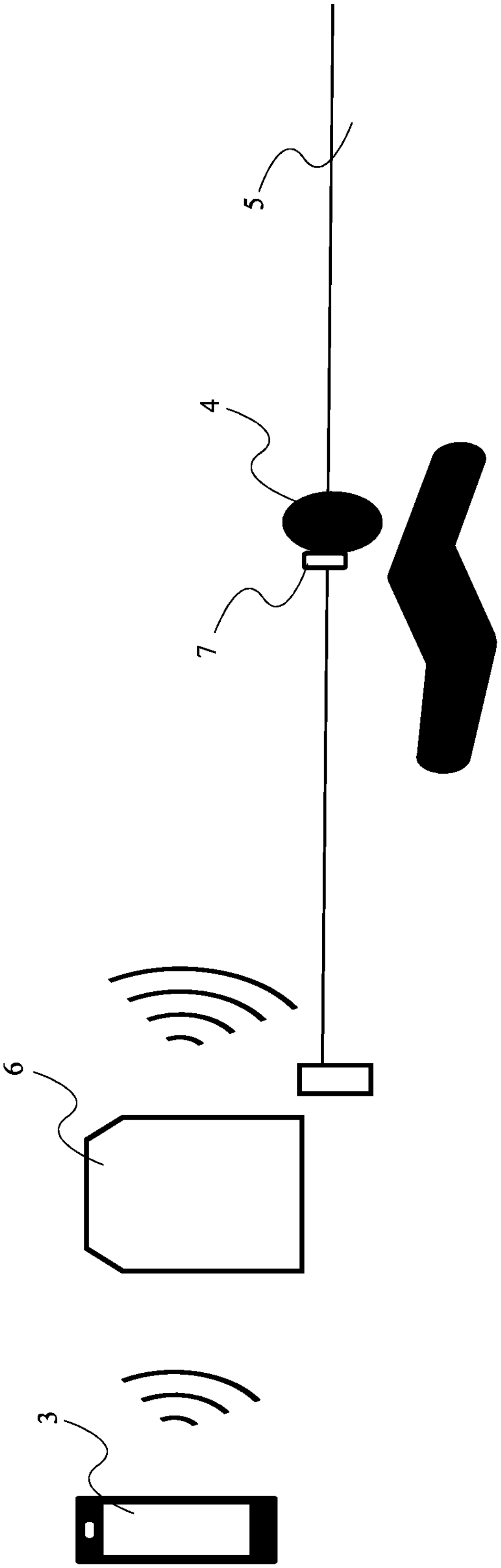
FIG. 4 is a schematic of the present invention in action, wherein the transmitting device is positioned outside a water body.

A more detailed description of the transmitting device 6, according to the present invention follows. It is an objective of the present invention to enable data reception through a protocol that involves audio. This audio signal is to be generated by common smart devices such as a smartphone or a tablet. The traditional methods of wireless transmission such as Bluetooth or Wi-Fi have poor data penetration through liquid materials such as lake, sea, or pool water. The general data rate available from 2.4 GHz (or 5 GHz) frequency bands from technologies like Bluetooth and Wi-Fi are significantly reduced with just a few inches of water. As a result, the present invention comprises a separate transmitter or the transmitting device 6 to handle much of the transmission range through the water. This transmitting device 6 may receive data from the mobile computing device 3 through traditional Bluetooth methods but can then pass the data to a different data transmission method that has less loss potential through water. Accordingly, the transmitting device 6 may be positioned over at least one of; a surface outside the water body 5 and a floating device on the water body 5. More specifically, in an embodiment where the transmitting device 6 is placed outside the water body 5, frequency modulated (FM) transmissions, that come from the transmitting device 6 may be transmitted to the receiving pods or the receiving device 7 near the surface of the water near the swimmer's ear. As seen in FIG. 4, in such embodiments, the transmitting device 6 is placed outside the water body 5 and the user 4 is swimming near the surface of the water. This transmission, external to the water, does have limited depth and as a result would not be suitable for a deeper diving or ocean scenario.

Figure 5:
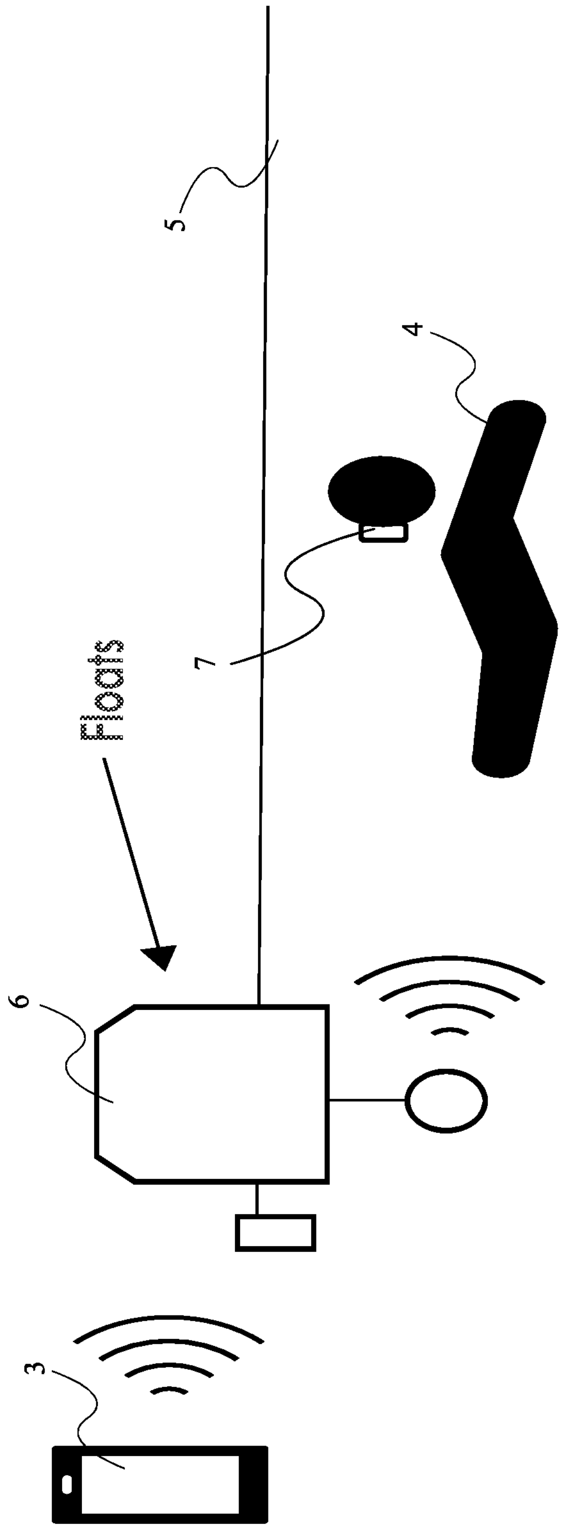
FIG. 5 is a schematic of the present invention in action, wherein the transmitting device is positioned floating, on top of the water body.

Accordingly, in an embodiment as represented in FIG. 5, where the user 4 is diving deeper under the water body 5, a sonic or ultrasonic transmitter may be used, wherein the transmitting device 6 is placed in a floating device or is floating with the help of an inbuilt float, over the water. In other words, wherein the transmitting device 6 is floating on the water body, the transmitting device 6 is at least one of a sonic transmitter and a supersonic transmitter. Thus, in this case, the wireless communication means is positioned above the water and the frequency transmission below the water. Other transmission options include acoustic and optical transmission methods, as well as the potential new opportunities from 5G discussed above.

A more detailed description of the present invention follows. According to the preferred embodiment, and as seen in FIG. 1, the communication system 2 is integrated between the mobile computing device 3 and the earplug device 1, the mobile computing device 3 is communicably coupled to the transmitting device 6, the transmitting device 6 is communicably coupled to the receiving device 7, and the receiving device 7 is communicably coupled to the earplug device 1.

In order to accomplish the smooth functioning of the present invention, the communication member 11 of the earplug device 1 further comprises a first power unit 15, a first microcontroller 16, a first wireless communication module 17, an amplifier 18, and a speaker 19. The first power unit 15 is a rechargeable battery, that is used to deliver electrical power to the first microcontroller 16, and other electrical and electronic components of the earplug device 1. To that end, the first power unit 15 is electrically connected to the microcontroller 16. However, any other source of power that is known to one of ordinary skill in the art, or a combination of the following sources may be employed for the smooth functioning of the earplug device 1, as long as the intents of the present invention are not altered. Examples of such power sources include, but are not limited to, Li ion batteries, magnetic power converters, etc. Further, the first power unit 15 may be connected to the plurality of HID 12 that enables to temporarily shut off and restore the power to the components of the earplug device 1. Furthermore, the first power unit 15 may comprise an electrical terminal that allows the earplug device 1 to receive electrical power from an external power supply. The first microcontroller 16 is a processing device that interprets commands received from the HID 12 and uses these commands to manage the operation of the electrical components within the present invention. To that end, the first wireless communication module 17, the amplifier 18, and the speaker 19 are electronically connected to the first microcontroller 16, and the first microcontroller 16 is electronically connected to the plurality of HID 12. Further, the first wireless communication module 16, connects and communicates with external devices via wireless data transmission protocols. Example standards of what the wireless communication module is capable of using includes, but are not limited to, Bluetooth, WI-FI, GSM, CDMA, ZigBee, etc. The speaker 19 enables the user 4 to listen to audio signals transmitted/received through the wireless communication module 17 in the earplug device 1, and the amplifier 18 amplifies or enhances these audio signals for clearly listening to them under water.

The frequency transmission and reception of the present invention may occur with different communication methods, such as FM, ultrasonic, optical, or acoustic communications. Due to many factors such as antenna size, these may not be incorporated into the earplug device itself. There are potential 5G communications which may unlock the possibility of incorporating it all into the earplug device. However, in the preferred embodiment, the receiving device 7 is an ear pod case. Continuing with the preferred embodiment, and as seen in FIG. 1, the receiving device 7 or the ear pod case further comprises a second power unit 20, a second microcontroller 21, a second wireless communication module 22, a first receive module 23, and a first transmit module 24. The first receive module 23 enables users to receive music, instructions and other audio signals transmitted from the transmitting device 6, and the first transmit module 24 transmits the necessary audio signals to the earplug device 1. In other words, the first receive module 23 and the first transmit module 24 helps with transmission and receival of signals through wireless communication means.

The second power unit 20 is a rechargeable battery, that is used to deliver electrical power to the second microcontroller 21, and other electrical and electronic components of the receiving device 7. To that end, the second power unit 20 is electrically connected to the second microcontroller 21. However, any other source of power that is known to one of ordinary skill in the art, or a combination of the following sources may be employed for the smooth functioning of the receiving device 7, as long as the intents of the present invention are not altered. Examples of such power sources include, but are not limited to, Li ion batteries, magnetic power converters, etc. Further, the second power unit 20 may comprise an electrical terminal that allows the receiving device to receive electrical power from an external power supply. The second microcontroller 21 is a processing device that manage the operation of the electrical components within the receiving device 7. To that end, the first receive module 23, the first transmit module 24, and the second wireless communication module 22 are electronically connected to the second microcontroller 21.

Continuing with the preferred embodiment, and as seen in FIG. 1, the transmitting device 6 further comprises a third power unit 25, a third microcontroller 26, a third wireless communication module 27, a second receive module 28, and a second transmit module 29. The second receive module 28 and the second transmit module 29 enable effective wireless transmission, filtering, and communication of audio signals between the transmitting device 6 and the receiving device 7. The third power unit 25 is a rechargeable battery, that is used to deliver electrical power to the third microcontroller 26, and other electrical and electronic components of the transmitting device 6. To that end, the third power unit 25 is electrically connected to the third microcontroller 26. However, any other source of power that is known to one of ordinary skill in the art, or a combination of the following sources may be employed for the smooth functioning of the transmitting device 6, as long as the intents of the present invention are not altered. Examples of such power sources include, but are not limited to, Li ion batteries, magnetic power converters, etc. Further, the third power unit 25 may comprise an electrical terminal that allows the transmitting device 6 to receive electrical power from an external power supply. The third microcontroller 26 is a processing device that manage the operation of the electrical components within the transmitting device 6. To that end, the second receive module 28, the second transmit module 29, and the third wireless communication module 27 are electronically connected to the third microcontroller 26. In an alternate embodiment, there is also potential for the case to be wired directly to the pods, eliminating the need for another wireless system. In other words, the receiving device 7 and the earplug device 1 may not need a short distance wireless communication module as they are directly connected through a wired system.

In reference to FIG. 2 and FIG. 3, the earplug device 1 comprises a first end 1*a*, a second end 1*b*, and a channel 1*c*. Preferably, the first end 1*a* is positioned opposite to the second end 1*b* across the earplug device 1, wherein the earplug device 1 diverges from the first end 1*a* towards the second end 1*b*. This is so that, the first end 1*a* may be inserted into the ear canal of the user. Preferably, the channel 1*c* traverses centrally into the vacuum chamber 9 within the silicone case 8, from the first end 1*a*, such that audio signals generating from the speaker 19 may reach the ears of the user through the channel 1*c*. Furthermore, as seen in FIG. 3, the plurality of HID 12 is mounted adjacent the second end 1*b* of the earplug device 1, such that the user may easily access the HID 12 protruding outside of the user's ears.

Continuing with the preferred embodiment, the SOS signal member 13*a* comprises at least one of a manual signal mode and an automatic signal mode. In other words, the SOS signal member 13*a* may include a manual and automatic signal mechanism. Preferably, wherein the SOS signal member 13*a* is in an automatic signal mode, the system would continuously monitor the sensor member (haptic) 14 for an input signal, and an SOS signal will be output when the input signal from the haptic sensor member is not received. More specifically, the haptic sensors may be configured so that when they are not touched or tapped within a set interval (e.g., once every few minutes), SOS signals are automatically sent to an outside source, whether the user's or another designated person's computing device. In such embodiments, software (e.g., voice reminders) can be included so that users can be notified via the speaker (which can be included in the SOS signal member) to touch or tap it within the predetermined interval. For example, if the user 4 is scuba diving and encounters a shark or other dangerous animal, or if the user's oxygen tank falls off the user's body or malfunctions, the user can press the SOS signal member 13*a* to send an SOS signal to a designated person on a boat or someone otherwise nearby who can provide help. If a user is scuba diving and suddenly faints or has a seizure under high water pressures, the present invention's automatic SOS function can detect the user's unconscious state and automatically send an SOS signal.

Alternately, wherein the SOS signal member 13*a* is in a manual signal mode, the system comprises pressing an SOS button 13*b* for a predefined period of time to output an SOS signal, wherein the SOS button 13*b* is part of the SOS signal member 13*a*. More specifically, the SOS button 13*b* is pressed or depressed for a certain time (e.g., 3 seconds) to send an SOS signal to an outside source. In some embodiments, the manual signal mode may include voice countdown software to notify the user of the elapsed time. To accomplish this functionality, the SOS button 13*b* is communicably coupled with the communication member 11.

Figure 6:
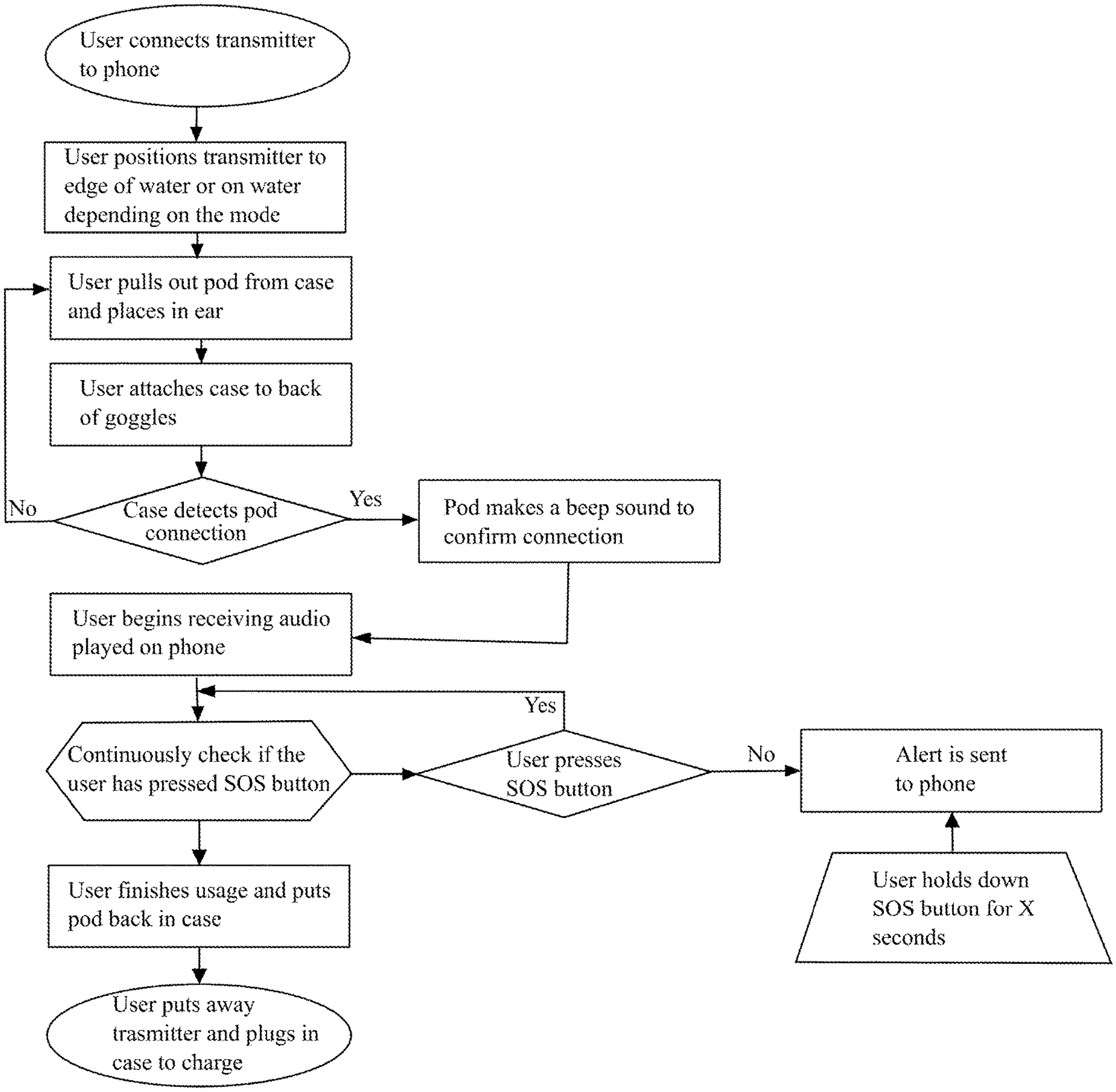
FIG. 6 is a flow diagram of a method of operation of a first embodiment of the present invention.
Figure 7:
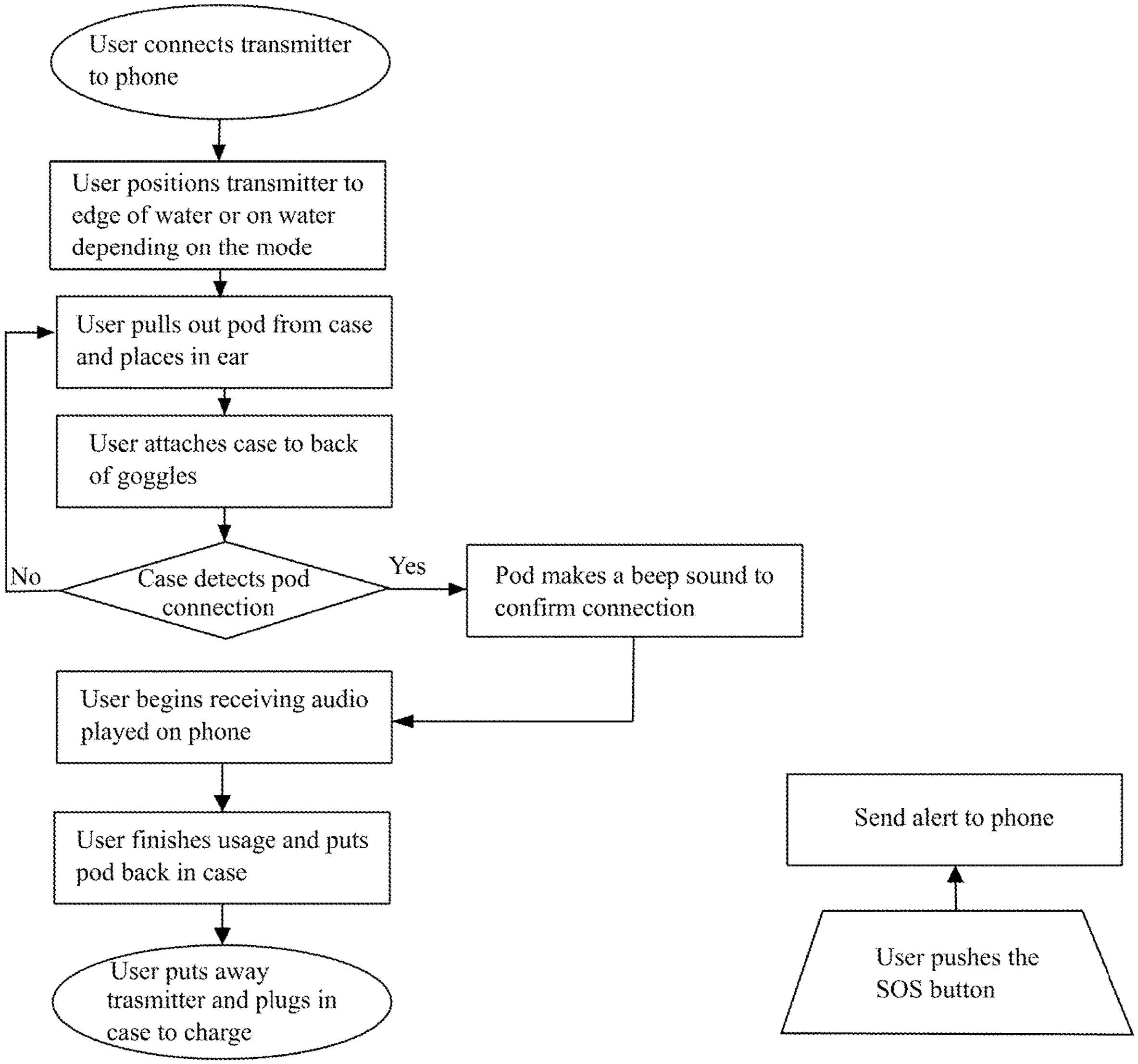
FIG. 7 is a flow diagram of a method of operation of a second embodiment of the present invention.

In reference to FIG. 6 and FIG. 7, a plurality of steps followed by the user to operating the present invention in two different modes of the SOS signal member are illustrated. Accordingly, as seen in FIG. 6, the user 4 first connects the transmitting device 6 to the phone or the mobile computing device 3. Depending on the mode of operation swimming preference, the transmitting device 6 is positioned at the edge of water (outside water) or over the water body 5 in a floating mode. Preferably, the ear pod case or the receiving device 7 is mounted onto the goggles of the user 4. However, the receiving device 7 may be mounted onto any other accessory or location on the user 4, as long as the intents of the present invention are not hindered. Just before entering into the water body 5, the user 4 pulls out the earplug device 1 (pods) from the pod case (receiving device 7), puts them in his ears, and attaches the receiving device 7 back onto the goggles on the user 4. Subsequently, if the receiving device 7 (case) detects the pod (ear plug device 1) connection, the pod makes a beep sound to confirm connection. If no connection is established, then the user 4 has to put the pod back in the case and pull them out again until connection is established. Once connection is established and the beep sound is heard, the user 4 starts receiving audio signals generated from the mobile computing device 3. As seen in FIG. 6, if the SOS signal member 13*a* uses an automatic mode, the system continuously checks if the user 4 has pressed the SOS signal member 13*a* or SOS button 13*b*. If the user 4 presses the SOS button 13*b* at desired intervals, the audio signals continue to play in the earplug device 1 and the system continues monitoring the SOS signal member 13*a* for a signal from the user 4. If the user 4 doesn't press the SOS button 13*b* within that predefined time interval, then the system sends an alert or SOS signal to the mobile computing device 3. In this embodiment, an SOS signal may also be sent if the user voluntarily presses the SOS button 13*b* for a fixed amount of time. After finishing usage, the user puts the pods back in the case, the case may be put on charge and the transmitting device 6 may be put away.

In reference to FIG. 7, the working of the system and the devices are same, except that there would be no continuous monitoring of the SOS signal member 13*b*. In this embodiment, an SOS signal will be sent only when the user 4 presses/pushes the SOS button 13*b* for a predefined time interval.

Although the invention has been explained in relation to its preferred embodiment, it is to be understood that many other possible modifications and variations can be made without departing from the spirit and scope of the invention as hereinafter claimed.

What is claimed is:

1. An underwater ear pod system comprising:
an earplug device;
a communication system;
a mobile computing device;
the earplug device comprising a silicone case, a vacuum chamber, a plurality of flanges, a communication member, and a plurality of human interface devices (HID);
the communication system comprising a transmitting device and a receiving device;
the plurality of HID comprising at least one of, a plurality of control buttons, a haptic sensor member, and an SOS (save our ship) signal member;
the earplug device being communicably coupled with the mobile computing device through the communication system;
the earplug device being inserted into at least one ear canal of a user, wherein the user is engaged in a water-related activity within a water body;
the vacuum chamber being positioned within the silicone case;
the communication member being mounted within the vacuum chamber;
the plurality of flanges being laterally mounted onto the silicone case;
the plurality of HID being externally mounted onto the silicon case;
the transmitting device being positioned over at least one of, a surface outside the water body and a floating device on the water body;
a first power unit, a first microcontroller, a first wireless communication module, an amplifier, and a speaker;
the first power unit being electrically connected to the microcontroller;
the first wireless communication module, the amplifier, and the speaker being electronically connected to the first microcontroller; and
the first microcontroller being electronically connected to the plurality of HID.

2. The underwater ear pod system of claim 1, comprising:
the communication system being integrated between the mobile computing device and the earplug device;
the mobile computing device being communicably coupled to the transmitting device;
the transmitting device being communicably coupled to the receiving device; and
the receiving device being communicably coupled to the earplug device.

3. The underwater ear pod system of claim 1, wherein the transmitting device is placed over a floating device on the water body, the transmitting device is at least one of a sonic transmitter and a supersonic transmitter.

4. The underwater ear pod system of claim 1, the receiving device further comprising:
a second power unit, a second microcontroller, a second wireless communication module, a first receive module, and a first transmit module;
the second power unit being electrically connected to the second microcontroller; and
the second receive module, the second transmit module, and the second wireless communication module being electronically connected to the second microcontroller.

5. The underwater ear pod system of claim 1, the transmitting device further comprising:
a third power unit, a third microcontroller, a third wireless communication module, a second receive module, and a second transmit module;
the third power unit being electrically connected to the third microcontroller; and
the third receive module, the third transmit module, and the third wireless communication module being electronically connected to the third microcontroller.

6. The underwater ear pod system of claim 1, wherein the plurality of flanges is flexible.

7. The underwater ear pod system of claim 1, wherein the silicone case is conical in shape.

8. The underwater ear pod system of claim 7, comprising:
the earplug device comprising a first end, a second end, and a channel;
the first end being positioned opposite to the second end across the earplug device, wherein the earplug device diverges from the first end towards the second end;
the first end being inserted into the ear canal of the user;
the channel traversing centrally into the cavity within the silicone case, from the first end; and
the plurality of HID being mounted adjacent the second end.

9. The underwater ear pod system of claim 1, wherein the receiving device is an ear pod case.

10. The underwater ear pod system of claim 1, wherein the SOS signal member comprising at least one of a manual signal mode and an automatic signal mode.

11. The underwater ear pod system of claim 10, wherein the SOS signal member is in an automatic signal mode, the system being configured to:
continuously monitor the haptic sensor member for an input signal; and
output an SOS signal when the input signal from the haptic sensor member is not received.

12. The underwater ear pod system of claim 10, wherein the SOS signal member is in a manual signal mode, the system being configured to:
press an SOS button for a predefined period of time to output an SOS signal, wherein the SOS button is part of the SOS signal member; and
the SOS button being communicably coupled with the communication member.

13. An underwater ear pod system comprising:
an earplug device;
a communication system;
a mobile computing device;
the earplug device comprising a silicone case, a vacuum chamber, a plurality of flanges, a communication member, and a plurality of human interface devices (HID);
the communication system comprising a transmitting device and a receiving device;
the plurality of HID comprising at least one of, a plurality of control buttons, a haptic sensor member, and an SOS (save our ship) signal member;
the earplug device being communicably coupled with the mobile computing device through the communication system;
the earplug device being inserted into at least one ear canal of a user, wherein the user is engaged in a water-related activity within a water body;
the communication system being integrated between the mobile computing device and the earplug device;
the mobile computing device being communicably coupled to the transmitting device;

the transmitting device being communicably coupled to the receiving device;

the receiving device being communicably coupled to the earplug device;

the vacuum chamber being positioned within the silicone case;

the communication member being mounted within the vacuum chamber;

the plurality of flanges being laterally mounted onto the silicone case, wherein the plurality of flanges being flexible;

the plurality of HID being externally mounted onto the silicon case;

the transmitting device being positioned over at least one of, a surface outside the water body and a floating device on the water body;

the earplug device comprising a first end, a second end, and a channel;

the first end being positioned opposite to the second end across the earplug device, wherein the earplug device diverges from the first end towards the second end;

the first end being inserted into the ear canal of the user;

the channel traversing centrally into the cavity within the silicone case, from the first end; and the plurality of HID being mounted adjacent the second end.

14. The underwater ear pod system of claim 13, wherein the transmitting device is placed over a floating device on the water body, the transmitting device is at least one of a sonic transmitter and a supersonic transmitter.

15. The underwater ear pod system of claim 13, wherein the receiving device is an ear pod case.

16. The underwater ear pod system of claim 13, wherein the SOS signal member comprising at least one of a manual signal mode and an automatic signal mode.

17. The underwater ear pod system of claim 16, wherein the SOS signal member is in an automatic signal mode, the system being configured to:

continuously monitor the haptic sensor member for an input signal; and output an SOS signal when the input signal from the haptic sensor member is not received.

18. The underwater ear pod system of claim 16, wherein the SOS signal member is in a manual signal mode, the system being configured to:

press an SOS button for a predefined period of time to output an SOS signal, wherein the SOS button is part of the SOS signal member; and the SOS button being communicably coupled with the communication member.

* * * * *